(12) United States Patent
Schneider et al.

(10) Patent No.: US 9,201,669 B2
(45) Date of Patent: Dec. 1, 2015

(54) SYSTEMS AND METHODS FOR MOBILITY SERVER ADMINISTRATION

(75) Inventors: Kenneth Cyril Schneider, Blue Mountains (CA); Lenny Kwok-Ming Hon, Richmond Hill (CA); Qiusheng Wang, Burlington (CA)

(73) Assignee: BlackBerry Limited, Waterloo, Ontario (CA)

( * ) Notice: Subject to any disclaimer, the term of this patent is extended or adjusted under 35 U.S.C. 154(b) by 1592 days.

(21) Appl. No.: 12/771,364

(22) Filed: Apr. 30, 2010

(65) Prior Publication Data

US 2010/0281487 A1 Nov. 4, 2010

Related U.S. Application Data

(60) Provisional application No. 61/175,024, filed on May 3, 2009.

(51) Int. Cl.
*G06F 9/445* (2006.01)
*H04L 29/06* (2006.01)

(52) U.S. Cl.
CPC ........ *G06F 9/44505* (2013.01); *G06F 9/44526* (2013.01); *G06F 9/44536* (2013.01); *G06F 9/44552* (2013.01); *H04L 63/10* (2013.01); *H04L 63/20* (2013.01)

(58) Field of Classification Search
CPC ...... G06F 9/44526; H04L 63/20; H04L 63/10
USPC ................. 709/201–230; 718/102–106, 762
See application file for complete search history.

(56) References Cited

U.S. PATENT DOCUMENTS

| 5,797,128 | A  | * | 8/1998  | Birnbaum        | 1/1     |
|-----------|----|---|---------|-----------------|---------|
| 5,889,953 | A  | * | 3/1999  | Thebaut et al.  | 709/221 |
| 8,250,540 | B2 | * | 8/2012  | Kulaga et al.   | 717/126 |
| 8,413,209 | B2 | * | 4/2013  | Aldera et al.   | 726/1   |
| 8,635,618 | B2 | * | 1/2014  | Aggarwal et al. | 718/102 |
| 2003/0191763 | A1 | * | 10/2003 | Cheng et al. | 707/100 |
| 2004/0049841 | A1 | * | 3/2004  | Brotherston et al. | 4/480 |
| 2004/0064348 | A1 | * | 4/2004  | Humenansky et al. | 705/7 |
| 2004/0162882 | A1 | * | 8/2004  | Mora | 709/207 |
| 2005/0172015 | A1 |   | 8/2005  | Rana et al. | |

(Continued)

OTHER PUBLICATIONS

International Search Report for International Patent Application No. PCT/CA2010/000644, dated Jul. 27, 2010, 4 pages.
Written Opinion of the International Searching Authority for International Patent Application No. PCT/CA2010/000644, dated Jul. 27, 2010, 8 pages.

(Continued)

*Primary Examiner* — Lashonda Jacobs
(74) *Attorney, Agent, or Firm* — Jon Gibbons; Fleit Gibbons Gutman Bongini & Bianco P.L.

(57) ABSTRACT

An administration server of an administration service assigns attributes to objects by a plug-in of the administration service. The plug-in implements a method of a functionality set and the method is callable by the administration service to perform the assigning. Additionally or alternatively, the administration server triggers a reconciliation event by changing the assignment of an attribute of the users that comprise objects of plug-ins; determines a scope of the users and which objects are affected by changing the assignment; and reconciles conflicting assignments. Additionally or alternatively, the administration server adds tasks by the plug-ins to a job created by the plug-ins with the tasks performing the assigning; and removes tasks from the job to optimize it.

33 Claims, 16 Drawing Sheets

(56) References Cited

U.S. PATENT DOCUMENTS

| | | | |
|---|---|---|---|
| 2005/0198273 A1* | 9/2005 | Childress et al. | 709/224 |
| 2006/0195508 A1 | 8/2006 | Bernardin et al. | |
| 2006/0242126 A1* | 10/2006 | Fitzhugh | 707/3 |
| 2007/0220599 A1* | 9/2007 | Moen et al. | 726/12 |
| 2008/0052712 A1* | 2/2008 | Gustafson et al. | 718/101 |
| 2009/0024992 A1* | 1/2009 | Kulaga et al. | 717/177 |
| 2009/0298478 A1* | 12/2009 | Tyhurst et al. | 455/414.1 |
| 2009/0300137 A1* | 12/2009 | Tyhurst et al. | 709/217 |
| 2010/0115526 A1* | 5/2010 | Mincarelli | 718/104 |

OTHER PUBLICATIONS

"Improving object-oriented user interfaces with constraints," RK Edge, http://www.sciencedirect/com, downloaded Apr. 28, 2010, 2 pages.

Bertino, Elisa, et al., "Securing XML Documents with Author-X," IEEE Internet Computing, May-Jun. 2001, pp. 21-31.

International Preliminary Report on Patentiability, received in corresponding PCT Application No. PCT/CA2010/000644, Dated May 13, 2011, 16 pages.

* cited by examiner

Describe Host Email Instance

| Host Instance Information | Messaging | Email message filters | Extension Plug-ins |
|---|---|---|---|

810

Host Instance Information

Host Service name: RD_EMAIL_1
Friendly Description:
Service Email (Exchange)

Instance statistics

Forwarded Messages: 1
Pending Data Packets: 0
Expired Messages 6

General

BlackBerry Email Services Version: 5.0.0.0

Supported Email (Exchange) Instances name     Desc

Exchange 1A
Exchange 1B

◉ Edit host instance
○ Clear statistics (disp msg "cleared")
◎ View services list

FIG.8B

BlackBerry Domains > NA Corporate > Components > Dispatcher Category > Dispatcher > Dispatcher HA 1...

Instances

Describe Dispatcher...

| Instance information | Supported Sametime Instant Messaging Instances | |
|---|---|---|
| Supported Office Instant Messaging Instances | Supported MDS-CS Instances | |
| Name | | Description |
| MDS-CS (BMS-02.rim.net) | | |
| CS 2 | | |

- ↻ Manual Failover
- ⏱ Set Primary to Standby
- 🔍 Edit instance
- ◎ View services list

User ID:

Last Name:

Model:

IT Policy Status:

Carrier:

Application:

None selected

None selected

Mail Server:

False

Display Name

User Management > Manage Users > View User

Manage users

Describe Manage users.....

| User information | Groups | Roles | Software configurations | Policies | WLAN configurations |
|---|---|---|---|---|---|
| Component information | Associated device | | Message settings | SIP Configuration | |

Name

Display Name:

First Name:                                                          User Name

Authentication Type

BlackBerry Administration Service

◉ Edit user

☐ Send message to user

◉ Back to search results

BlackBerry Enterprise Server status

⊕ Switch BlackBerry user to different BES

⊘ Disable as BlackBerry user

User status   —1110

◉ Reload User

FIG.11

SYSTEMS AND METHODS FOR MOBILITY SERVER ADMINISTRATION

CROSS REFERENCE TO RELATED APPLICATIONS

The present application claims priority to U.S. Provisional Patent Application No. 61/175,024, filed May 3, 2009, by Ken Schneider, et al, entitled "Systems and Methods for Mobility Server Administration", all of which are incorporated by reference herein as if reproduced in its entirety.

FIELD OF TECHNOLOGY

This disclosure relates to systems and methods for supporting and provisioning mobile devices, and in particular to systems and methods for providing administration services to servers that support mobile devices.

BACKGROUND

A variety of wireless mobile devices are now available, including devices which support one or more data-related applications, such as e-mail, calendar, contact management, other personal information management (PIM) applications, and other similar applications. Although there exist a variety of suitable system architectures in which wireless mobile devices may be applied, an architecture which has found favor in enterprise environments involves relatively small wireless mobile devices which implement the aforementioned data-related applications (e.g., e-mail, calendar, contact management, other personal information management (PIM) applications, and other similar applications) in conjunction with enterprise-run "back-end" servers or services which support these applications, and which may be accessed by a variety of client devices. For example, an enterprise may operate one or more servers that provide messaging or e-mail services to a variety of client devices. The enterprise may also operate one or more servers that provide calendar, contact management, or other PIM services to client devices. Sometimes, several of these services are integrated in a "groupware" server.

In general, the enterprise messaging and PIM servers (hereafter, "application servers") have been designed to support a particular class of conventional client devices consisting of conventional personal computers (whether in notebook or other form), which are connected to the enterprise network either directly, or indirectly via a connection method which is largely transparent to the server. Many wireless mobile devices are not conventional client devices, in that they are not conventional personal computers or are not directly or transparently connected to the enterprise network. In order to provide a high level of service to wireless mobile devices (other than conventional client devices), an enterprise may deploy one or more mobility servers (along with other optional infrastructure elements) which provide intermediation services between the application servers and the wireless mobile devices. The intermediation services may include, for example, management of synchronization of contents between the application server and the wireless mobile device, rapid delivery of e-mail or other content to the wireless mobile device, and adaptation of content to be delivered to the wireless mobile device in a manner consistent with the capabilities of the device and the transport media (e.g., carrier and transport networks) by which the device is connected to the application server.

A concern among information technology personnel responsible for managing an enterprise fleet of wireless mobile devices and the enterprise infrastructure to support them is the orderly administration of a mobility server, and its associated wireless mobile devices, their users, the services and applications provided thereto, and the policies governing their operation.

BRIEF DESCRIPTION OF THE DRAWINGS

The disclosure will be more clearly understood by reference to the following detailed description of example embodiments and in conjunction with the accompanying drawings by way of illustration. In the drawings, like numerals describe substantially similar components throughout the several views.

FIGS. 8A and 8B are a display diagram depicting an example display area of a graphical user interface for use in conjunction with the system of FIG. 1;

FIGS. 9A and 9B are a display diagram depicting an example display area of a graphical user interface for use in conjunction with the system of FIG. 1;

FIGS. 10A and 10B are a display diagram depicting an example display area of a graphical user interface for use in conjunction with the system of FIG. 1; and FIG. 11 is a display diagram depicting an example display area of a graphical user interface for use in conjunction with the system of FIG. 1.

DETAILED DESCRIPTION

Figure 1:
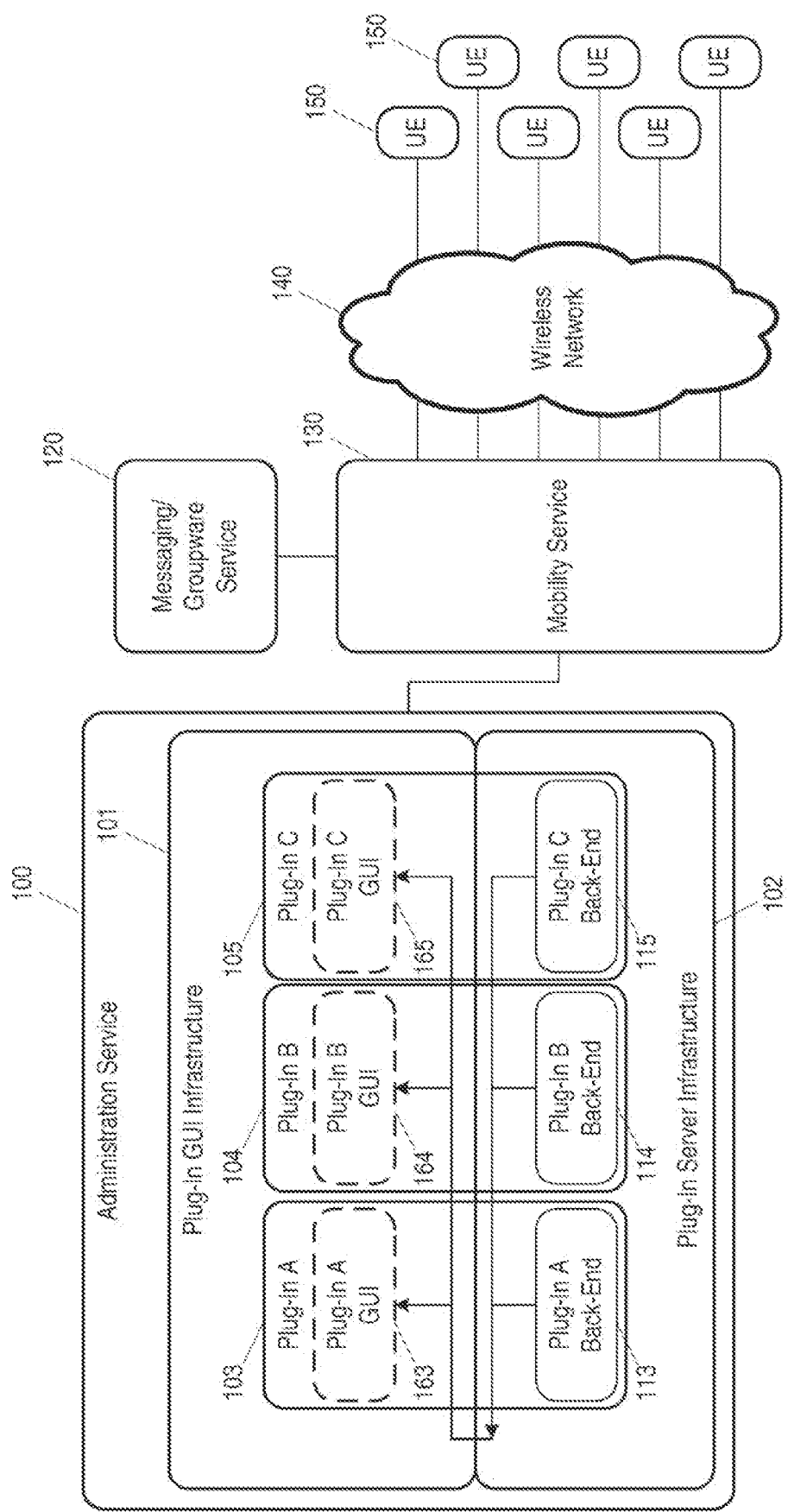
FIG. 1 is a block diagram depicting a system constructed according to an aspect of the present disclosure for providing administration services to a mobility server.
Figure 6:
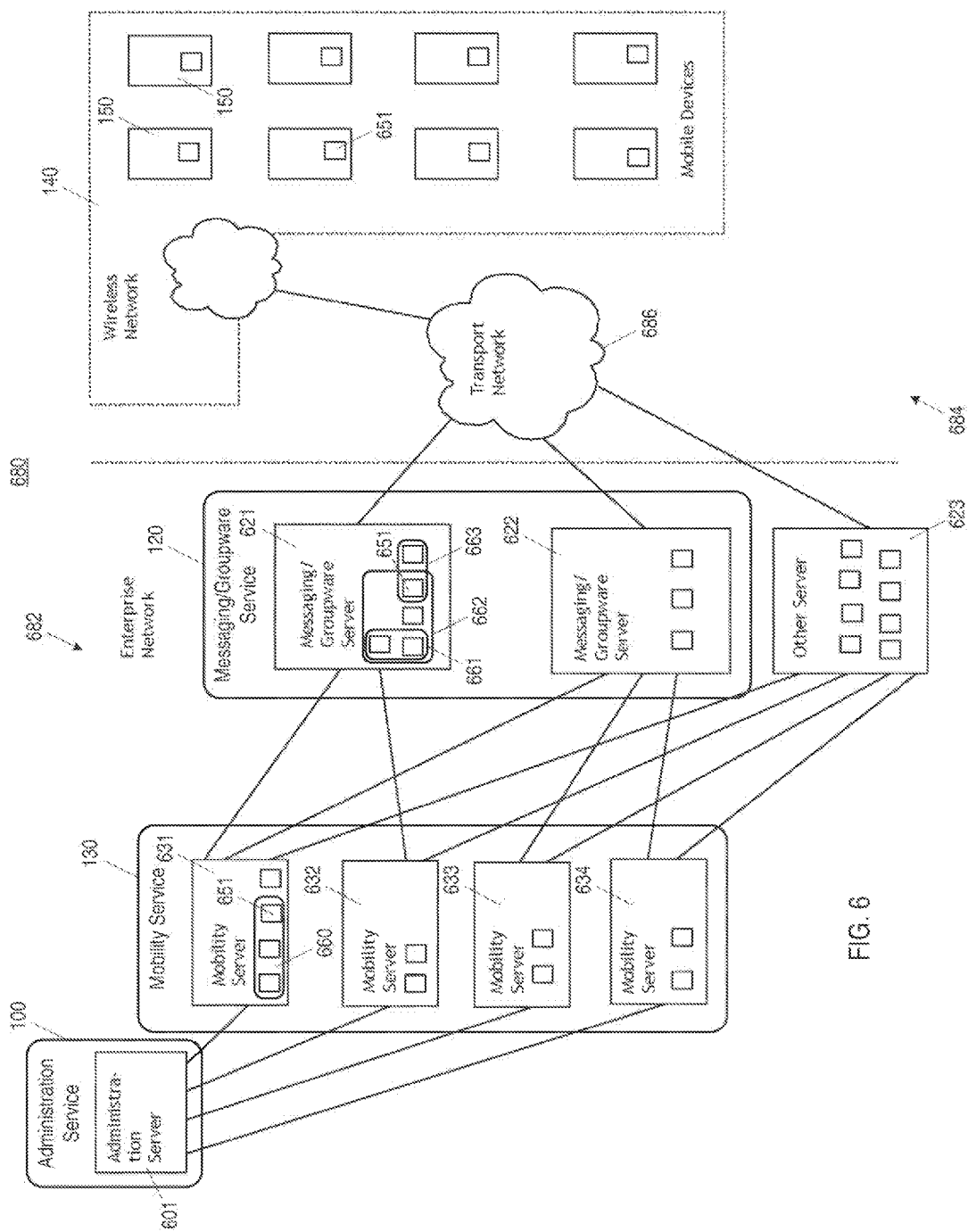
FIG. 6 is a block diagram depicting a communications system, showing an example environment in conjunction with which the system of FIG. 1 may be used.

According to an aspect of the present disclosure, and as best seen in FIGS. 1 and 6, an administration service 100 is provided for administering a mobility service 130, including users, devices, services, and policies associated therewith. FIG. 6 is a block diagram depicting, as an example environment in which the administration service 100 may be employed, a communications system 680. As best seen in FIG. 6, communications system 680 comprises an enterprise network part 682, and a network part 684 which is generally external to the enterprise network 682. For a non-limiting example, the external network part 684 may comprise a wireless network 140 which is operatively coupled to the enterprise network 682 through a transport network 686.

As best seen in FIGS. 1 and 6, an administration server 601 of administration service 100 can administer attributes of one or more users (e.g., user 651). A user can use many different services, including services provided by mobility service 130, messaging/groupware service 120, and various other applications services and servers generally shown as 623, all of which the user can access via user equipment (UE 150). In some embodiments, the mobility service 130 provides an intermediation function between UE 150 and various services and servers, e.g., 120 and 623, of enterprise network 682. The intermediation services may include, for example, management of synchronization of contents between application services, such as messaging/groupware service 120, server 623, and the UE 150; rapid delivery of e-mail or other content to the UE 150; and adaptation of content to be delivered to the UE 150 in a manner consistent with the capabilities of the UE 150 and such elements of external network 684 as wireless network 140 and transport network 686. In some embodiments, although the mobility service 130 significantly improves the user experience, the user may be unaware of its existence. In other embodiments, the mobility service 130 may directly provide user-visible services. A user 651 can be a member of one or more groups (660-661 and 663) and be serviced by one or more servers (631 and 621) of one or more services (130 and 120). Additionally, a group (e.g., 662) can comprise one or more other groups (e.g., 661).

Examples of attributes that can be assigned to a user (651) can include: information technology (IT) policies, software configurations, applications (which may be required, optional, or disallowed), device software configurations, device software bundles, native application settings, or any other application settings. The management and assignment of the number, types, and functionality of attributes can be controlled by the administration server 601. As best seen in FIG. 1, the functionality of the administration service 100 may be extended by additional software components 103, 104, and 105, referred to hereafter as "plug-ins". Although three plug-ins are shown and described, any number of plug-ins can be used. Thus, the attributes that administration server 601 can manage and assign can be continuously extended by adding plug-ins, as discussed further below in the section titled PLUG-INs.

Additionally, attributes can also be assigned to groups (660-663), services (120 and 130), servers (631-634 and 621-623), and can be assigned to domains upon which the servers (631-634 and 621-623) reside. A user (651) can inherit attributes assigned to groups, services, servers, and domains with which the user is associated. Users may inherit or be assigned an attribute that conflicts with other attributes that are assigned to groups, services, servers, or domains with which the user is associated. When various attributes that are assigned to a user conflict, a reconciliation of the various attributes can occur based on rules that indicate which assignment has priority so that the proper attribute can be assigned to the user, which is discussed below in the section titled RECONCILIATION MANAGEMENT.

Additionally, when an attribute of a group, server, service, or domain is changed, all the users associated with that group server service or domain can be affected and may need reconciliation. Also, when one or more attributes are changed, a job can be created that comprises one or more tasks that bring about the assignment of a reconciled attribute to a user. Multiple tasks of multiple jobs may bring about similar assignments resulting in duplicate and/or superfluous tasks that can be optimized out to reduce the number of duplicate or superfluous tasks, which is discussed below in the section titled JOB MANAGEMENT.

The present application relates to mobile communications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the relevant arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

Plug-Ins

FIGS. 1 and 6 are a block diagrams depicting a communications system 680 that includes one or more user equipment (UE) 150, wireless network 140, mobility service 130, messaging/groupware service 120, and administration service 100. UE 150 can be used to send and receive messages via wireless network 140, messaging/groupware service 120, and mobility service 130. Examples of UE 150 include smart phones such as those commercially available under the BLACKBERRY brand, cellular telephones, or any other portable handheld device that can wirelessly send and receive messages.

Wireless network 140 provides for the communication between UE 150 and messaging/groupware service 120, other services or servers 623 (FIG. 6) and mobility service 130. The wireless network 140 may be implemented as any suitable wireless access network technology. By way of example, but not limitation, the wireless network 140 may be implemented as a wireless network that includes a number of base stations (not shown), each containing radio transmitting and receiving equipment adapted to provide wireless radio-frequency (RF) network service or "coverage" to a corresponding area or cell. The wireless network 140 is typically operated by a mobile network service provider that provides subscription packages to users of wireless mobile devices or user equipment (UE) 150. The wireless network 140 may be implemented as any appropriate wireless network, including but not limited to any to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX). Other network types and technologies could also be used. Wireless network 140 could also be implemented as a wireless local area network (WLAN) or wireless metropolitan area network (WMAN) or any combination of the aforementioned networks. As best seen in FIG. 6, a transport network may be used to couple wireless network 140 to elements of the enterprise network 682. Transport network 686 may be implemented using any suitable network technology for coupling the wireless network 140 and the enterprise network 682. For example, transport network 686 may be implemented using any combination of the public Internet, private network facilities, leased facilities, private overlays on a shared network (sometimes called a virtual private network or "VPN"), or any other suitable network technology. Enterprise network 682 may be implemented using any suitable network technology including local network technologies (LANs), wide-area network technologies (WANs), wireless network technologies, and the like. Any of the networks mentioned may employ optical, electrical, coaxial, waveguide, free-space radio or microwave, or any other suitable media, in conjunction with switches, routers, and other appropriate interconnection means.

In some embodiments, the mobility service 130 provides an intermediation function between UE 150 and various services and servers, e.g., 120 and 623, of enterprise network 682. The intermediation services may include, for example: management of synchronization of contents between application services, such as messaging/groupware service 120, server 623, and the UE 150; rapid delivery of e-mail or other content to the UE 150; and adaptation of content to be delivered to the UE 150 in a manner consistent with the capabilities of the UE 150 and such elements of external network 684 as wireless network 140 and transport network 686. For example, mobility service 130 can provide for synchronizing messages between one or more UEs 150 and messaging/groupware service 120. Mobility service 130 can comprise one or more programs operating on one or more servers. Mobility service 130 can use multiple policies to control how and what messages and data are synchronized with UEs 150. A suite of software that implements a mobility service is commercially available from Research In Motion under the name BLACKBERRY ENTERPRISE SERVER software.

Messaging/groupware service 120 can send and receive messages to and from users of its service and can comprise one or more programs operating on one or more servers. Programs that operate as messaging/groupware services are commercially available from Microsoft under the name EXCHANGE software, from IBM under the name LOTUS DOMINO software, and from Novell under the name GROUPWISE software. Other messaging/groupware software could also be used. Types of messaging/groupware services can include email service, instant messaging service, session initiation protocol (SIP) service, or any other service that allows for sending and receiving messages to and from users.

Administration service 100 can provide a single point for all management activities within the mobility service 130. Many areas of independent functionality are managed by administration service 100. Administration service 100 delegates various management details to independent components that implement specific areas of functionality. These independent components are known as "plug-in" modules (103, 104, and 105) that each comprise a respective plug-in back-end component (113, 114, and 115) and can optionally comprise a respective plug-in GUI component (163, 164, and 165). Plug-in modules (plug-ins) can interact with Administration service 100 via a plug-in graphical user interface (GUI) infrastructure 101 and via a plug-in server infrastructure 102.

Plug-in GUIs 163, 164, and 165 of plug-ins 103, 104, and 105 interact with plug-in GUI infrastructure 101 through one or more GUI integration points. A GUI integration point includes a place in the GUI of administration service 100 where user interaction can take place. Integration points can be defined by: a navigation location to get to a point in the GUI, a mounting point where integration is to take place; and contiguous screen area boundaries into which the plug-ins (103-105) can render information and interact with the user. A GUI integration point can be any of several types including: a navigation tree node, a page, a tab, a band, and a link, and an item in a context menu (a pop-up menu), or any other GUI element.

Figure 7A:
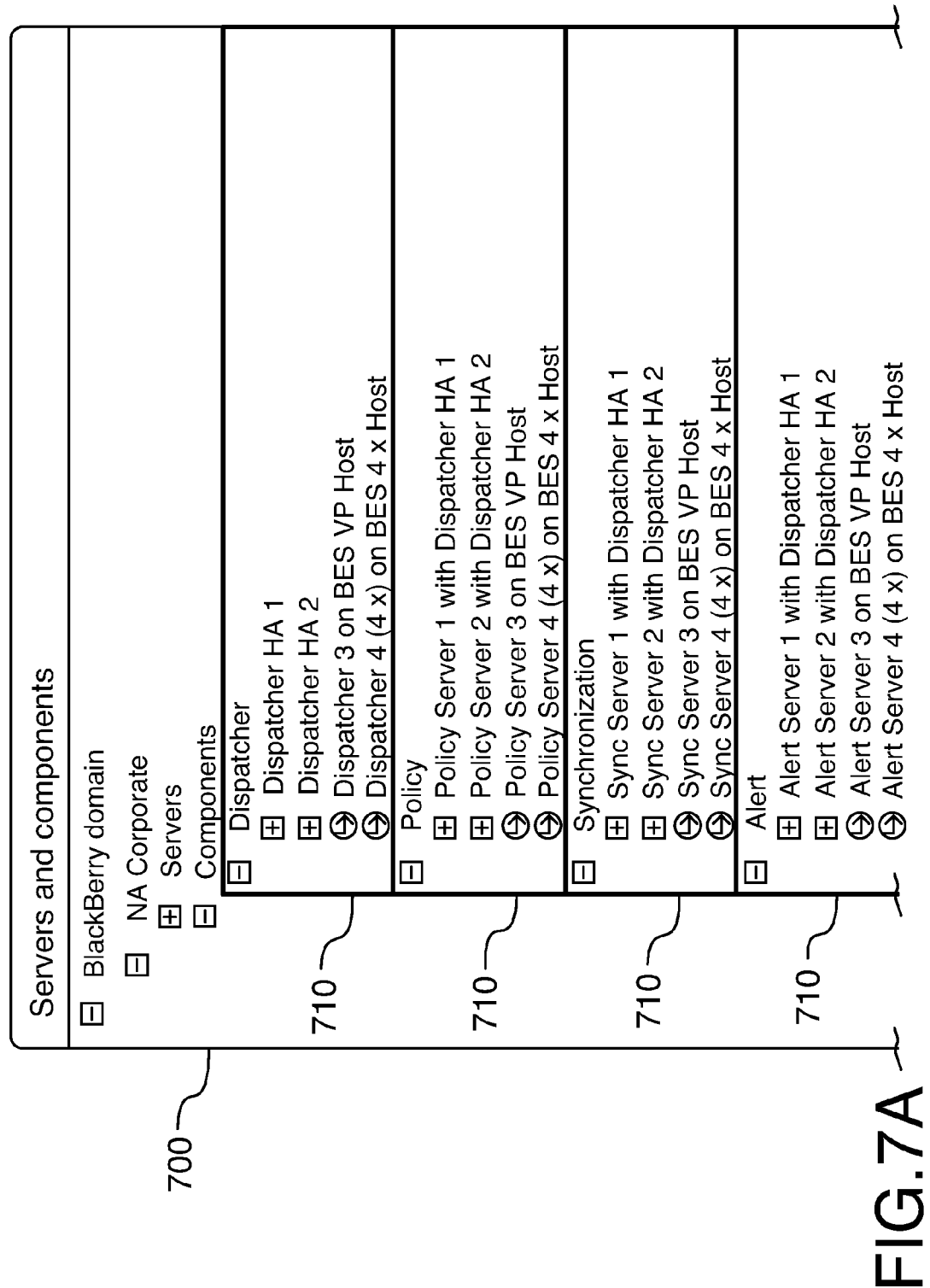
FIGS. 7A and 7B are a display diagram depicting an example display area of a graphical user interface for use in conjunction with the system of FIG. 1.
Figure 7B:
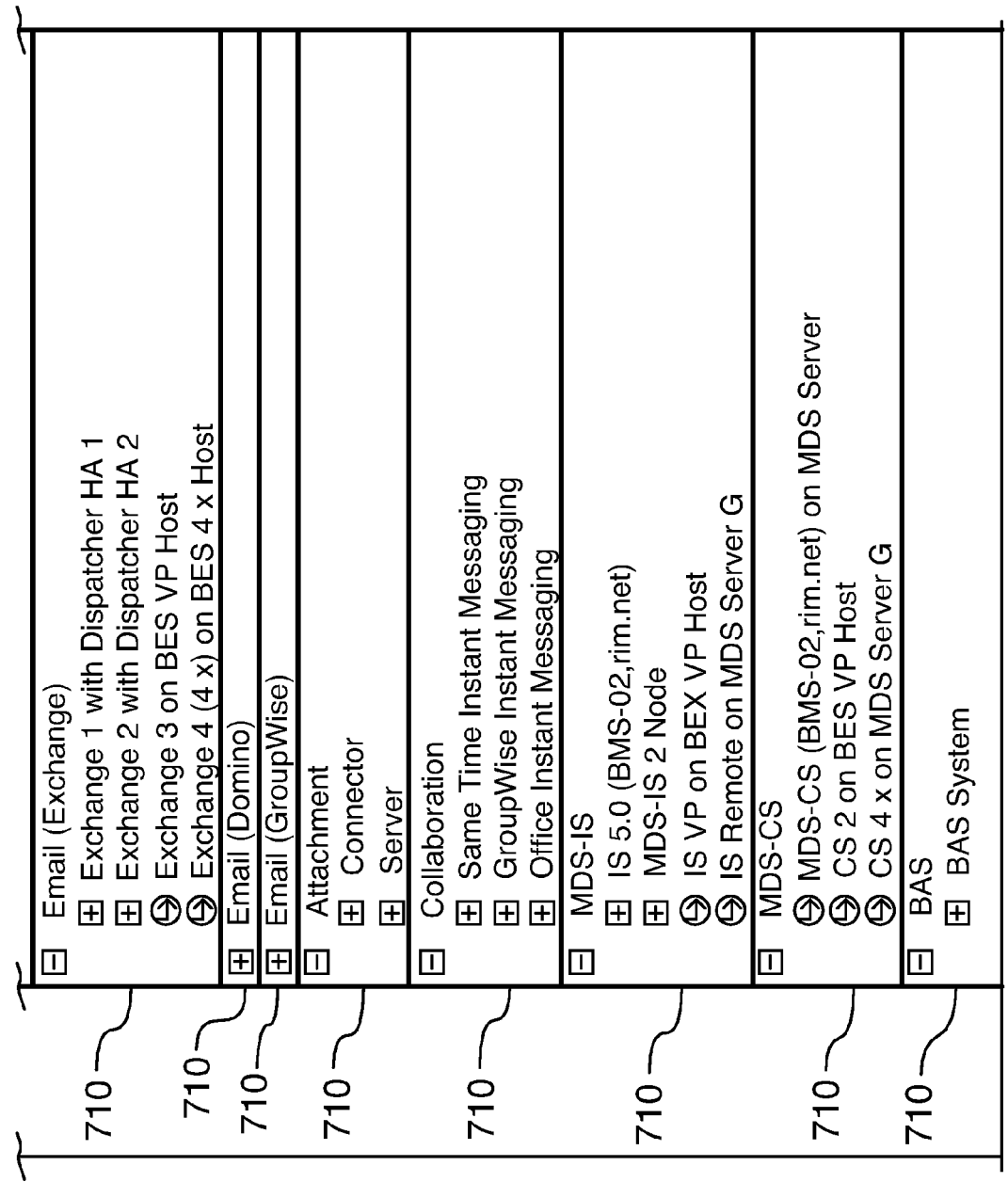

A navigation tree node GUI integration point can comprise one or more nodes in a navigation tree. FIGS. 7A and 7B are a display diagram showing an example navigation tree in display area 700 with multiple integration points 710 outlined in black.

Figure 8A:
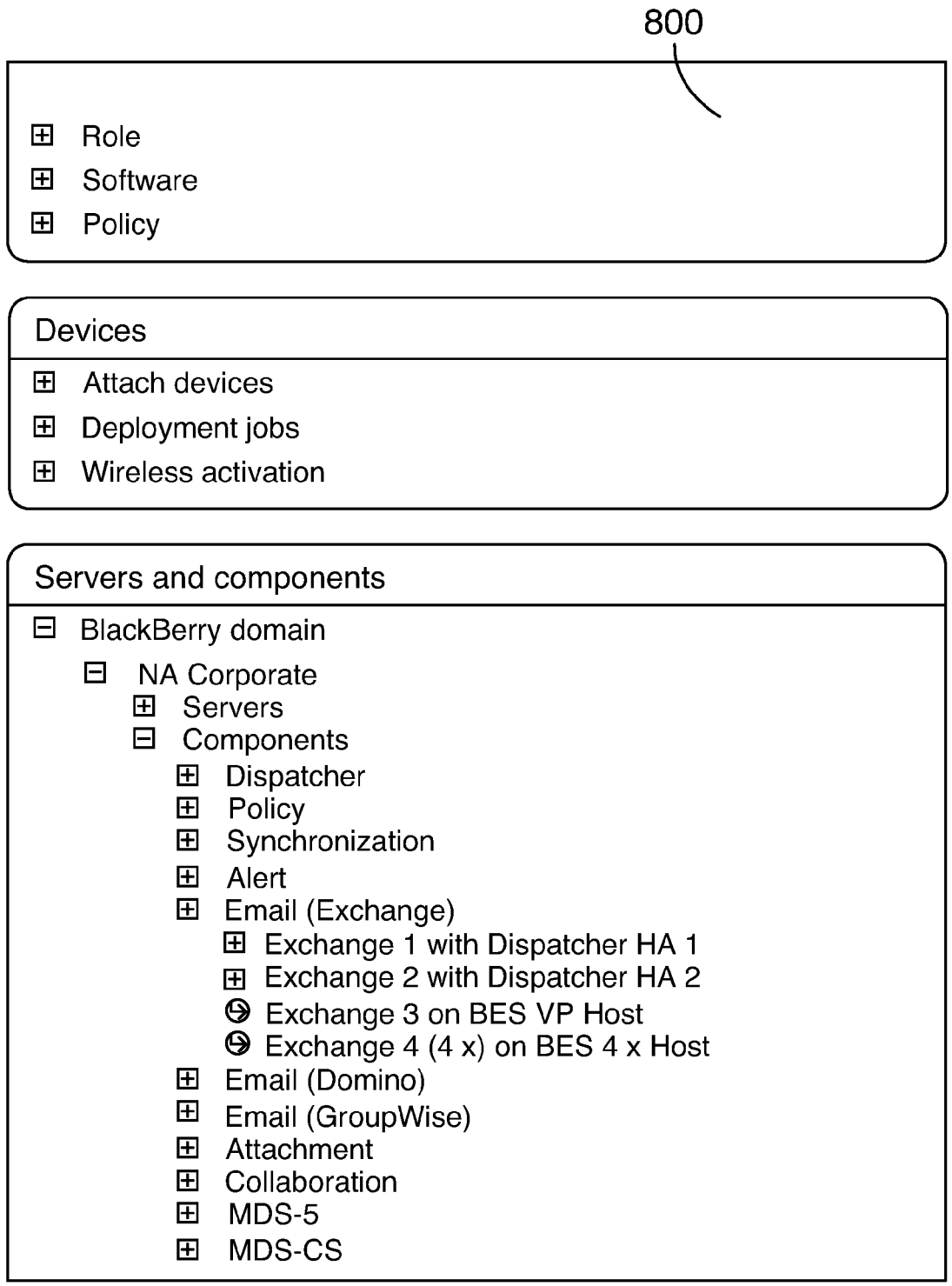

FIGS. 8A and 8B are a display diagram showing an example Page GUI Integration Point. A Page GUI integration point can comprise the full screen under the context title as shown by area 810 of display area 800.

Figure 9B:
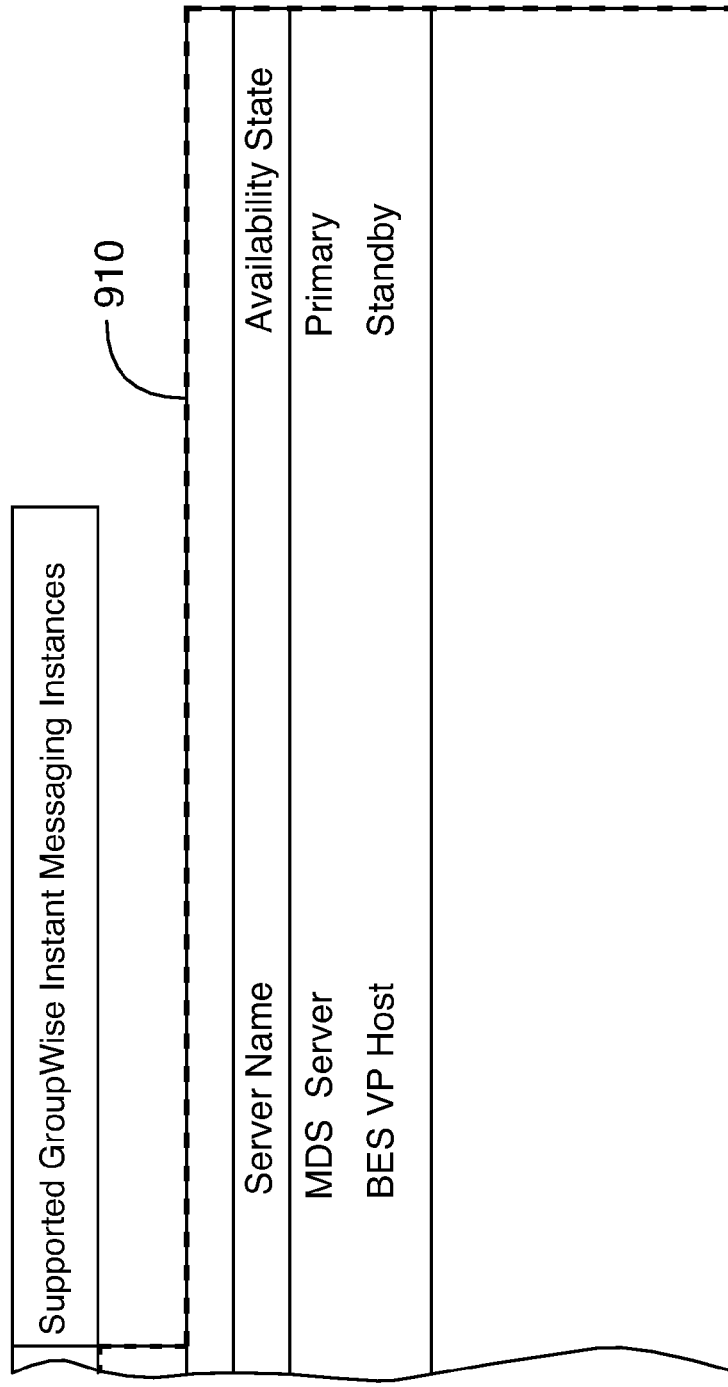

FIGS. 9A and 9B are a display diagram showing an example tab GUI integration point. A tab GUI integration point can comprise a tab plus the screen area below the tab as shown by area 910 of display area 900.

Figure 10A:

FIGS. 10A and 10B are a display diagram showing an example band GUI integration point. A band GUI integration point can comprise a horizontal slice of the screen delimited by a new band as shown by areas 1010 of display area 1000.

FIG. 11 is a display diagram showing an example link GUI integration point. A link GUI integration point can comprise one or more links on the bottom of a screen as shown by area 1110 of display area 1100. The link may be clicked on to navigate to other portions of the GUI or to cause an action to be performed such as reloading the display of a user.

As best seen in FIG. 1, plug-in back-ends 113, 114, and 115 of plug-ins 103, 104, and 105, respectively, interact with plug-in server infrastructure 102 through one or more functionality sets. A functionality set includes the one or more functions or methods that are implemented by a plug-in (e.g., 103, 104, and 105) and used by the plug-in server infrastructure 102. Assigning the attributes to the users can be carried out through the execution of these methods. Any number of functionality sets can be defined and supported by administration service 100 and/or plug-in server infrastructure 102, including: a server functionality set, a user functionality set, a reconciliation functionality set, and a delivery functionality set. Also, a plug-in (e.g., plug-in A 103) can define its own functionality set which can then be implemented by other plug-ins (e.g., plug-ins B 104 and C 105). In this case, the extended functionality set is used by the plug-in that defines the extended functionality set. A functionality set allows for the implementation of functionality to be delegated to a plug-in without the plug-in server infrastructure knowing anything about the implementation of that functionality.

Administration service 100 can provide a full object data model for administration. Included within this data model are various base objects which are used within functionality sets. A plug-in which implements a functionality set that includes base objects as parameters will extend those base objects with the plug-in's own specific attributes. These extended or polymorphic objects can be handled by the administration service 100 without the plug-in server infrastructure 102 knowing about any of the specific extensions.

The combination of functionality sets and polymorphic objects allows for the seamless integration of a plug-in. For example, plug-in A 103 can extend an extant user object with its own specific user attributes and, similarly, plug-in B 104 can extend the extant user object with its own specific user attributes. In other words, plug-in A can have a userA object and plug-in B can have a userB object, wherein both the userA object and the userB object extend from the extant user object. The administration service 100 can show all the attributes from the extant user object, the userA object, and the userB object and also allow these attributes to be edited and saved via plug-ins A 103 and B 104.

Figure 2:
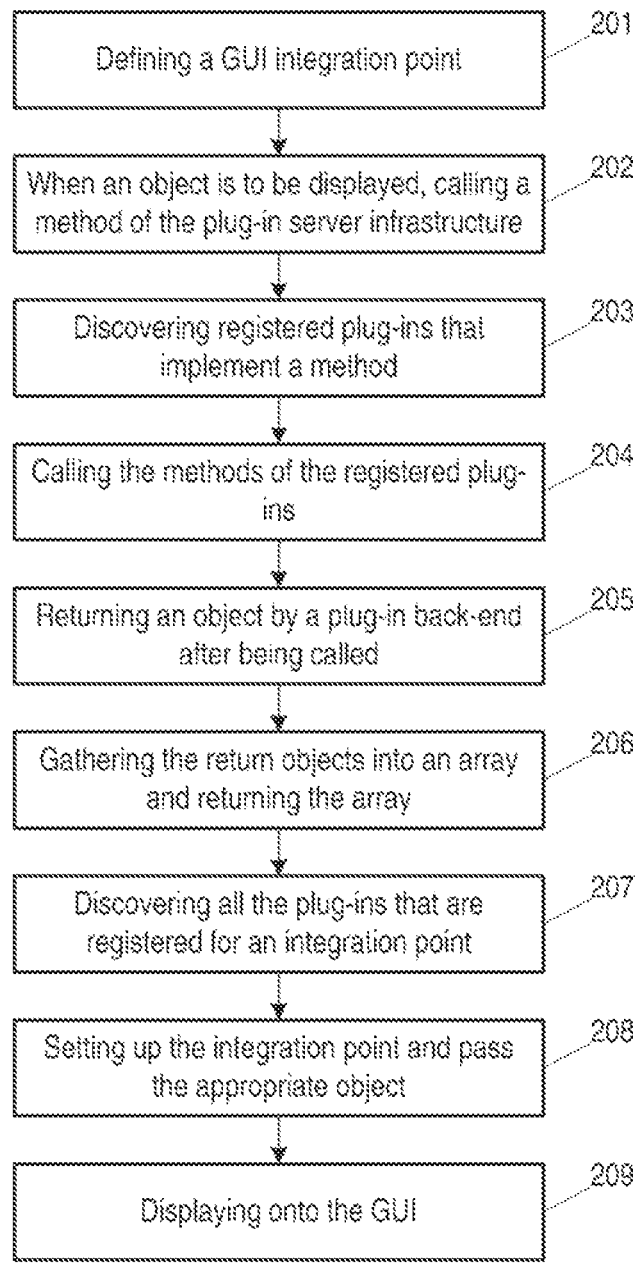
FIG. 2 is a flow diagram depicting an example method of integration in accordance with a "plug-in" software component arrangement for use with the system of FIG. 1.

FIG. 2 is a flow diagram depicting an example method by which the integration of a plug-in can take place. The steps or operations described herein are examples. There may be many variations to these steps or operations without departing from the scope of this disclosure. For instance, where appropriate, the steps may be performed in a differing order, or steps may be added, deleted, or modified. At step 201, plug-in GUI infrastructure can define a GUI integration point, such as a tab GUI integration point, for plug-ins A 103 and B 104 to display and/or edit attributes.

At step 202, the plug-in GUI infrastructure 101 determines, for example, that user objects are to be displayed, and accordingly, the plug-in GUI infrastructure 101 calls a find user method defined by the plug-in server infrastructure 102.

At step 203, the find user method can discover all of the plug-ins (e.g., plug-ins A 103 and B 104) that are currently registered which implement the user functionality set (this is the functionality set that includes the plug-ins' implementations of the find user method). At step 204, the plug-in server infrastructure 102 can then iteratively call the find user method of plug-ins A 103 and B 104 through the user functionality sets of plug-ins A 103 and B 104.

At step 205, plug-in back-ends A 163 and B 164 can return an object associated with the find user method. More specifically, the result of calling, in step 204, the find user method of the user functionality set implemented by plug-in A 103 is that the plug-in back-end A 163 returns a userA object. Similarly, the result of calling, in step 204, of the find user method of the user functionality set implemented by plug-in B 104 is that the plug-in back-end B 164 returns a userB object.

At step 206, the polymorphic user objects (the userA object and the userB object) can be gathered into an array and returned by the plug-in server infrastructure 102 to the plug-in GUI infrastructure 101.

At step 207, the plug-in GUI infrastructure 102 has the full set of user attributes (i.e., the array of user, userA, and userB objects) and discovers all of the plug-ins that are registered for the tab GUI integration point.

At step 208, for each registered plug-in, plug-in GUI infrastructure 102 sets up a tab and passes the polymorphic objects from the array to the appropriate plug-in GUIs to be rendered. As an example, the tab integration point for Plug-in A is called, passing the userA object, and the plug-in renders the attributes on the GUI. Similarly, the tab integration point for plug-in B is called, with the userB object, and the plug-in renders the attributes on the GUI.

At step 209 the full user object is displayed on the GUI of the administration service 100, which was facilitated by both the plug-in GUI infrastructure 101 and by the plug-in server infrastructure 102 without either of them knowing any of the plug-in specific details about the user.

In addition to displaying attributes, the plug-in architecture of administration service 100 also supports saving and searching the attributes. Many other functionalities can be supported by the plug-in architecture.

The plug-in architecture of administration service 100 via plug-in GUI infrastructure 101 and plug-in server infrastructure 102 may provide many potential benefits. One potential benefit is that the plug-in server infrastructure does not need to know any of the specific details of the specialized management components (plug-ins) that implement functionality sets and provide the functionality of the administration service 100.

Additionally, plug-in modules can be upgraded independently of administration service 100 or any other plug-in module at any time. Also, new plug-in modules can be added at any time and they simply appear in the administration service 100 GUI.

Another potential benefit is that plug-in modules can be developed independently, including by external third parties, and still be seamlessly incorporated into administration service 100 and look like a natural part of administration service 100.

Reconciliation Management

Administration service 100 can manage the assignment of attributes to users, groups, servers, services, and domains. These attributes can include such objects as applications, data, access rights, device configurations, software configurations, and policies. Sometimes, one or more plug-ins may try to set an attribute of a group (or user, service, server, or domain) that results in a conflict with one or more attributes that are directly or indirectly assigned to or inherited by a user. Administration service 100 can resolve conflicts that arise from reconciliation objects being assigned to the users, groups, servers, services, or domains.

Examples of reconciliation objects can include: IT Policies, software configurations, applications (which may be required, optional, or disallowed), application control policy (ACP) for unlisted applications, device software configurations, device software bundles, native application settings or any other application settings. The reconciliation objects are plug-in polymorphic objects, wherein the plug-in server infrastructure need not know the details of the reconciliation objects, but does know that they can be assigned to users, groups, services, servers, and domains. A plug-in can define new reconciliation objects at any time and extend the functionality of the entire system from a reconciliation point of view.

The following set of conditions is an example illustrating a situation in which reconciliation may be useful. A user is defined to a member of group A and group A is defined to be a member of group B. (As mentioned earlier, a group may contain other groups.) Subsequently, an attribute (IT Policy 1) is assigned directly to the user and another attribute (IT Policy 2) is assigned to group B. This means that the user would be assigned both IT Policy 1 and IT Policy 2. However, a constraint of communication system 680 is that only a single IT Policy may be active on any user's device (UE 150). According to an aspect of the present disclosure, the conflict resulting from the apparent assignment of two different IT Policies to a user (and thus the user's UE 150) can be reconciled through the use of reconciliation objects and reconciliation functionality sets.

A reconciliation functionality set allows the plug-in server infrastructure 102 to perform reconciliation without knowing exactly what the objects being reconciled are. One of the capabilities of a reconciliation functionality set is the ability to furnish to the plug-in server infrastructure a list of the reconciliation objects supported by a plug-in such as 103, 104, or 105. There are also several options with regard to a reconciliation operation that are made available through the functionality set. Specific business rules for resolving conflicts are implemented by each of the plug-ins 103, 104, or 105. The plug-in server infrastructure 102 can resolve conflicts by passing a set of reconciliation objects (of the specific types supported by the corresponding plug-in 103, 104, or 105) through the functionality set method to have the plug-in choose the reconciled value.

Any number of administration operations can cause the need for reconciliation to take place. Each specific situation that requires reconciliation can be represented by a reconciliation event. In other words, reconciliation events may be caused or generated by a number of administration operations, which can include:

an object has been assigned to a user, group, service, server, or domain or unassigned from a user, group, service, server, or domain;

a user or group has been added as a member of a group or removed as a member from a group;

a user has been added to a service or removed from a service;

a user has been added to a server or removed from a server;

a user has been added to a domain or removed from a domain;

a ranking of a set of reconciliation objects has changed;

a reconciliation object has been deleted;

a reconciliation object has been modified;

a user has activated a device;

a user has changed from one device to another;

a personal identification number (PIN) for a user's device has been set;

a user has moved to a different server within mobility service 130; and a UE 150 software (operating system (OS) bundle) has changed.

Any number of rules may be used by a plug-in to reconcile a conflict based on the constraints of the administration service 100 and communications system 680, which may include the business logic and security model needed to administer the mobility service 130 and associated UE 150. The rules may be extensive and complex. Different groups of reconciliation rules may be applied depending on the category of the reconciliation object. Example sets of rules for various types of reconciliation objects are provided below for reconciliation objects of the following types: User/Group Attributes; IT Policies; Applications; Application Control Policies; Device Software Bundles; and Native Application Settings.

User/Group Attribute Conflict Resolution Rule (a) Whenever a reconciliation object is assigned directly to a user, any reconciliation objects (of the same type) assigned to groups of which the user is a member of are ignored.

IT Policy Conflict Resolution Rules (a) Higher Ranked IT Policy Takes Precedence; and (b) Each IT Policy in the domain is ranked against each of the other IT Policies in the domain. When multiple IT Policies are applied to a user, the highest ranked IT Policy is the reconciled IT Policy.

Application Conflict Resolution Rules (a) Only applications that are supported by the user's current device (UE 150) and software are considered for reconciliation;

(b) Applications in a user assigned software configuration take precedence over a group assigned software configuration;

(c) An application with a higher version number takes precedence over a lower version number;

(d) Reconciling an application requires first reconciling the ACP for the application; in this case the disposition of an ACP belonging to an application in a user attached software configuration takes precedence over a group attached software configuration; the disposition of required takes precedence over optional which takes precedence over disallowed; the ACP settings are those from the highest ranked ACP that has the reconciled disposition;

(e) The delivery mode of a reconciled application is defined by a mode of push taking precedence over pull after considering a user attached software configuration taking precedence over a group attached software configuration;

(f) The delivery transport of a reconciled application is defined by a transport of wireless and wired if both are specified after considering a user attached software configuration taking precedence over a group attached software configuration;

(g) Wireless delivery transport is only reconciled if the user's device supports wireless application loading;

(h) Applications are only reconciled if all of the application and module dependencies are resolved by reconciled applications;

(i) Applications are only reconciled if there are no conflicting modules already present on the user's device (optional rule);

(j) Applications are only reconciled for wireless delivery transport if there are no circular dependencies; and (k) Applications are only reconciled if they will fit into the device memory; memory checking is performed for applications in the following order (stopping when memory is full): applications with a disposition of required, a transport delivery of wireless, and a transport mode of push; applications with a disposition of required, a transport delivery wired, a transport mode of push; applications with a disposition of optional, a transport delivery wireless, and a transport mode of push; applications with a disposition of optional, a transport delivery wired, and a transport mode of push; and applications with a disposition of optional, a transport delivery wireless, and a transport mode of pull.

Application Control Policy (ACP) for Unlisted Applications Conflict Resolution Rules (a) The disposition of an ACP for unlisted applications in a user attached software configuration takes precedence over a group attached software configuration;

(b) A disposition of disallowed takes precedence over optional; and (c) The ACP settings are those from the highest ranked ACP that has the reconciled disposition.

Device Software Bundle Conflict Resolution Rules (a) Device software bundles in a user attached software configuration takes precedence over a group attached software configuration; and (b) The highest ranked device software bundle that is supported by the user's device and carrier is reconciled provided it has a higher rank than the device software bundle that is already installed on the user's device.

Native Application Setting Conflict Resolution Rules (a) Native application settings are reconciled on a setting by setting basis;

(b) Native application settings belonging to a device software configuration in a user attached software configuration takes precedence over a group attached software configuration;

(c) For the "calendar initial view" setting the reconciled value is always the minimum number of days specified; values ordered from min to max are: day, week, month, agenda, last;

(d) For the "calendar keep appointments" setting the reconciled value is always the maximum number of days;

(e) For the "email confirm delete" setting the reconciled value of yes takes precedence over no;

(f) For the "email hide sent messages" setting the reconciled value of no takes precedence over yes;

(g) For the "email save copy in sent folder" setting the reconciled value of yes takes precedence over no;

(h) For the "address book sort by" setting the reconciled value of "first name" takes precedence over "last name" which takes precedence over "company"; and (i) Each of the above settings also have an attribute which defines if the setting is visible or not on the user's device and whether or not the user can change the value of the setting; the precedence order of the attribute for a setting is: locked and visible takes precedence over locked and hidden which takes precedence over unlocked and visible.

The reconciliation rules listed above are merely examples of reconciliation rules for a particular example embodiment of an administration service 100 for use in conjunction with an example communications system 680 and various associated requirements and constraints. Additional or varied rules may be needed for the listed categories of reconciliation objects and additional rules likely would be needed for any categories of reconciliation objects that might be added through reconciliation functionally sets that may be added. One of skill in the art will appreciate how these rules may be modified for use with an administration service 100 subject to different requirements and constraints.

Figure 3:
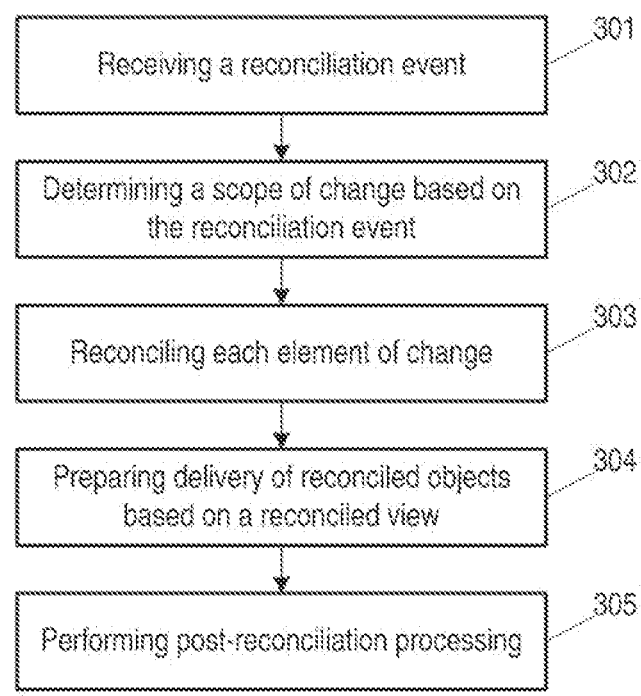
FIG. 3 is a flow diagram depicting an example method for reconciling objects in conjunction with the system of FIG. 1.

FIG. 3 is a flow diagram depicting a method of reconciliation that resolves the conflicts using the reconciliation objects that are triggered by the reconciliation events that can be used by administration service 100. The steps or operations described herein are examples. There may be many variations to these steps or operations without departing from the scope of this disclosure. For instance, where appropriate, the steps may be performed in a differing order, or steps may be added, deleted, or modified.

At step 301, administration service 100 gets a reconciliation event that was triggered. At step 302, based on the reconciliation event, administration service 100 can determine a scope of change. The scope of change can have the following dimensions: users who are affected by the change; and reconciliation object types that are affected by the change.

At step 303, administration service 100 can reconcile each element of change. In other words, for each reconciliation object for a specific user, administration service 100 can determine the reconciled view of that object type, wherein the reconciled view is determined by the set of rules related to the object. The rules required to reconcile a set of objects are implemented by a plug-in (such as 103, 104 or 105) and performed by the plug-in for the plug-in server infrastructure 102 using a reconciliation functionality set.

At step 304, based on the reconciled view of each object type for each user, administration service 100 can prepare for the delivery of the reconciled object. Preparing for the delivery of the reconciled object for a user can result in a series of job tasks (all belonging to a single job for the reconciliation event) being created to perform the actual delivery. The tasks include appropriate dependencies when ordering of the deliveries is important. Jobs and tasks are described below.

At step 305, after processing for the reconciliation event is complete, any post-reconciliation processing can be performed. Some events can require post-reconciliation processing. This processing is done through the reconciliation functionality set. An example of post-reconciliation processing is the physical delete of a logically deleted reconciliation object. The detailed reconciliation process can involve several queues to support scalable asynchronous processing of reconciliation events.

Job Management

A plug-in such as 103, 104, and 105 or administration service 100 can use jobs and tasks to accomplish their functionality (e.g., assigning attributes to a user). A plug-in 103, 104, or 105 or the administration service 100 itself can create any number of jobs within the administration service 100 and any plug-in 103, 104, or 105 or administration service 100 can create any number of tasks within any of the jobs within administration service 100. Tasks can operate to install or remove software (i.e., via an attribute for a software configuration) onto or from UEs 150. Several types of tasks are defined, including INSTALL, UNINSTALL, UPGRADE, and DOWNGRADE task types that correspond to installing, uninstalling, upgrading, and downgrading software on UEs 150.

Figure 4:
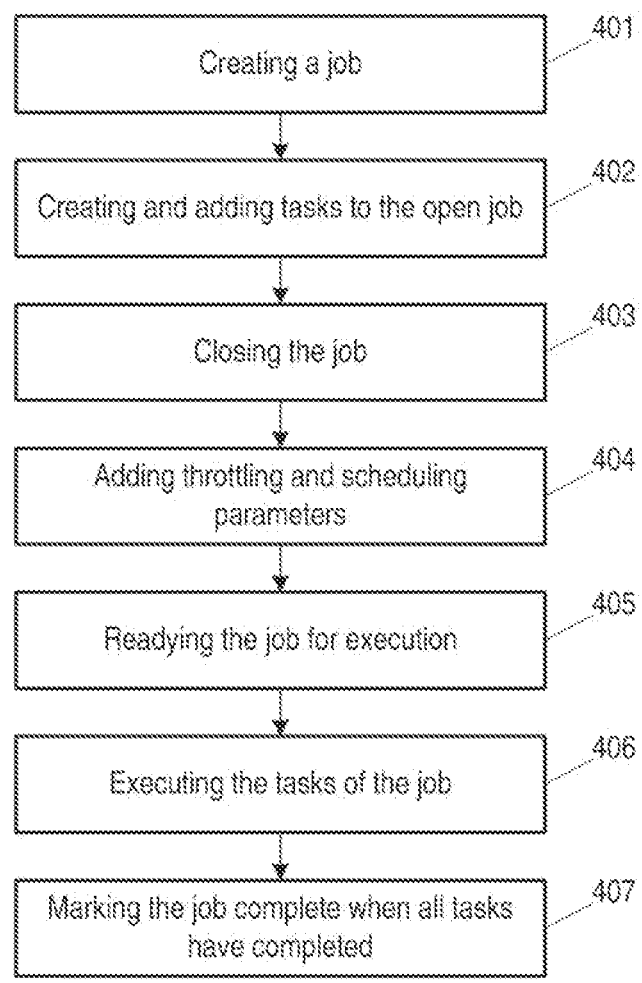
FIG. 4 is a flow diagram depicting an example method of creating and executing a job for use with the system of FIG. 1.

FIG. 4 is a flow diagram depicting an example method of creating and executing a job, effectively showing the life cycle of a job. The steps or operations described herein are examples. There may be many variations to these steps or operations without departing from the scope of this disclosure. For instance, where appropriate, the steps may be performed in a differing order, or steps may be added, deleted, or modified.

At step 401 a plug-in, such as 103, 104, or 105 or administration service 100 can create a job that is open for tasks to be added. At step 402, the plug-in 103, 104, or 105, or the administration service 100 can create tasks are created one at a time and add the tasks to any open job. During the creation, each task receives a number associated with the time the task was created such that tasks with lower numbers are can be identified as being created before tasks with higher numbers. One task can represent the delivery or removal of a reconciled view of an object type to or from a UE 150. At step 403, the plug-in 103, 104, or 105, or the administration service 100 can close the job is so that further tasks cannot be added and so that the job can be prepared for execution. A number of operations are carried out during job closure, which is described in more detail below. At step 404, administration service 100 can add default job scheduling and throttling parameters to the job. These job scheduling and throttling parameters can be changed at any by the plug-in 103, 104, or 105, or administration service 100. At step 405, administration service 100 can make the job ready for execution. At step 406, administration service 100 can execute the tasks of the job, possibly with multiple automatic retries when certain failure conditions occur. At step 407, when all tasks of the job have completed (successfully or with failure), administration service 100 can mark the job as completed.

The job closure process makes a job ready to be executed. During a job close process, the job is optimized according to predefined optimization rules to improve system performance. Initially all tasks within the job being closed are optimized with respect to just those tasks in the job being closed. An example of optimization rules for this case can include:

When a lower number INSTALL task (T1) already exists, the higher number INSTALL task (T2) is optimized out by task T1.

When a lower number INSTALL task (T1) already exists, the higher number UNINSTALL task (T2) is optimized out by task T1.

When a lower number INSTALL task (T1) already exists, the higher number UPGRADE task (T2) is optimized out by task T1.

When a lower number INSTALL task (T1) already exists, the higher number DOWNGRADE task (T2) is optimized out by task T1.

When a lower number UNINSTALL task (T1) already exists, the higher number INSTALL task (T2) is optimized out by task T1.

When a lower number UNINSTALL task (T1) already exists, the higher number UNINSTALL task (T2) is optimized out by task T1.

When a lower number UNINSTALL task (T1) already exists, the higher number UPGRADE task (T2) is optimized out by task T1.

When a lower number UNINSTALL task (T1) already exists, the higher number DOWNGRADE task (T2) is optimized out by task T1.

When a lower number UPGRADE task (T1) already exists, the higher number UNINSTALL task (T2) is optimized out by task T1.

When a lower number UPGRADE task (T1) already exists, the higher number UPGRADE task (T2) is optimized out by task T1.

When a lower number UPGRADE task (T1) already exists, the higher number DOWNGRADE task (T2) is optimized out by task T1.

When a lower number DOWNGRADE task (T1) already exists, the higher number UNINSTALL task (T2) is optimized out by task T1.

When a lower number DOWNGRADE task (T1) already exists, the higher number UPGRADE task (T2) is optimized out by task T1.

When a lower number DOWNGRADE task (T1) already exists, the higher number DOWNGRADE task (T2) is optimized out by task T1.

The above-listed rules may be generalized as follows: INSTALL and UNINSTALL tasks with lower numbers optimize out INSTALL, UNINSTALL, UPGRADE, and DOWNGRADE tasks with higher numbers. Also, UPGRADE and DOWNGRADE tasks with lower numbers optimize out UNINSTALL, UPGRADE, and DOWNGRADE tasks with higher numbers.

Additionally, all tasks within the job being closed can be optimized with respect to all tasks in all other jobs. The optimization rules in this case are as follows:

When an INSTALL task (T1) already exists and a new INSTALL task (T2) is being closed, task T1 is optimized out by task T2.

When an INSTALL task (T1) already exists and a new UNINSTALL task (T2) is being closed, task T1 is optimized out by task T2.

When an UNINSTALL task (T1) already exists and a new INSTALL task (T2) is being closed, task T1 is optimized out by task T2.

When an UNINSTALL task (T1) already exists and a new UNINSTALL task (T2) is being closed, task T1 is optimized out by task T2.

When an UPGRADE task (T1) already exists and a new INSTALL task (T2) is being closed, task T1 is optimized out by task T2.

When an UPGRADE task (T1) already exists and a new UNINSTALL task (T2) is being closed, task T1 is optimized out by task T2.

When an UPGRADE task (T1) already exists and a new UPGRADE task (T2) is being closed, task T1 is optimized out by task T2.

When an UPGRADE task (T1) already exists and a new DOWNGRADE task (T2) is being closed, task T1 is optimized out by task T2.

When a DOWNGRADE task (T1) already exists and a new INSTALL task (T2) is being closed, task T1 is optimized out by task T2.

When a DOWNGRADE task (T1) already exists and a new UNINSTALL task (T2) is being closed, task T1 is optimized out by task T2.

When a DOWNGRADE task (T1) already exists and a new UPGRADE task (T2) is being closed, task T1 is optimized out by task T2.

When a DOWNGRADE task (T1) already exists and a new DOWNGRADE task (T2) is being closed, task T1 is optimized out by task T2.

The above-listed rules may be generalized as follows: Existing INSTALL tasks can be optimized out by new INSTALL or UNINSTALL tasks that are being closed. Existing UNINSTALL tasks can be optimized out by new INSTALL or UNINSTALL tasks that are being closed. Existing UPGRADE and DOWNGRADE tasks can be optimized out by new INSTALL, UNINSTALL, UPGRADE, or DOWNGRADE tasks that are being closed.

Additionally or alternatively, a task can be added to a job that has already been closed and optimized. The job can be briefly reopened and then closed to add the new task. In this case, the optimization process can be skipped so that the job will not be optimized with respect to the new task.

A job also takes on scheduling and throttling parameters that can be changed at any time until the job is complete. Each object type can have its own set of scheduling and throttling parameters that apply to all of a job's tasks that pertain to the specific object type. Scheduling parameters for job tasks can schedule the execution of the tasks to occur at any of one or more times on any of one or more days of a week. Additionally, a scheduling parameter can schedule the execution of a job to begin at some future date. Job throttling parameters, which can quantify a number of job slots, can limit the execution of a task of a job and can be specified on a job basis by the number of tasks for a specific object type executing simultaneously and/or by the number of tasks executing in a scheduling window by limiting the number of job slots available to a job. A scheduling window is a contiguous period of time during a particular day during which a task may execute as defined by its scheduling parameters. System throttling parameters, which can quantify a number of system slots, can also be specified to limit the total number of tasks executing simultaneously across all jobs of the administration service 100 for a specific object type by limiting the number of system slots available to the administration service 100.

Additionally, a specific object type can be defined such that only one task may be executing at any instant of time that is related to a particular user of mobility service 130, regardless of the particular instance of the object. In such a case, a running dependency is created among all the tasks for all jobs that pertain to that specific object type for a user. This effectively single-threads this type of reconciliation object type for a user. The running dependencies between all such tasks are adjusted dynamically as required as the various tasks execute.

Figure 5A:
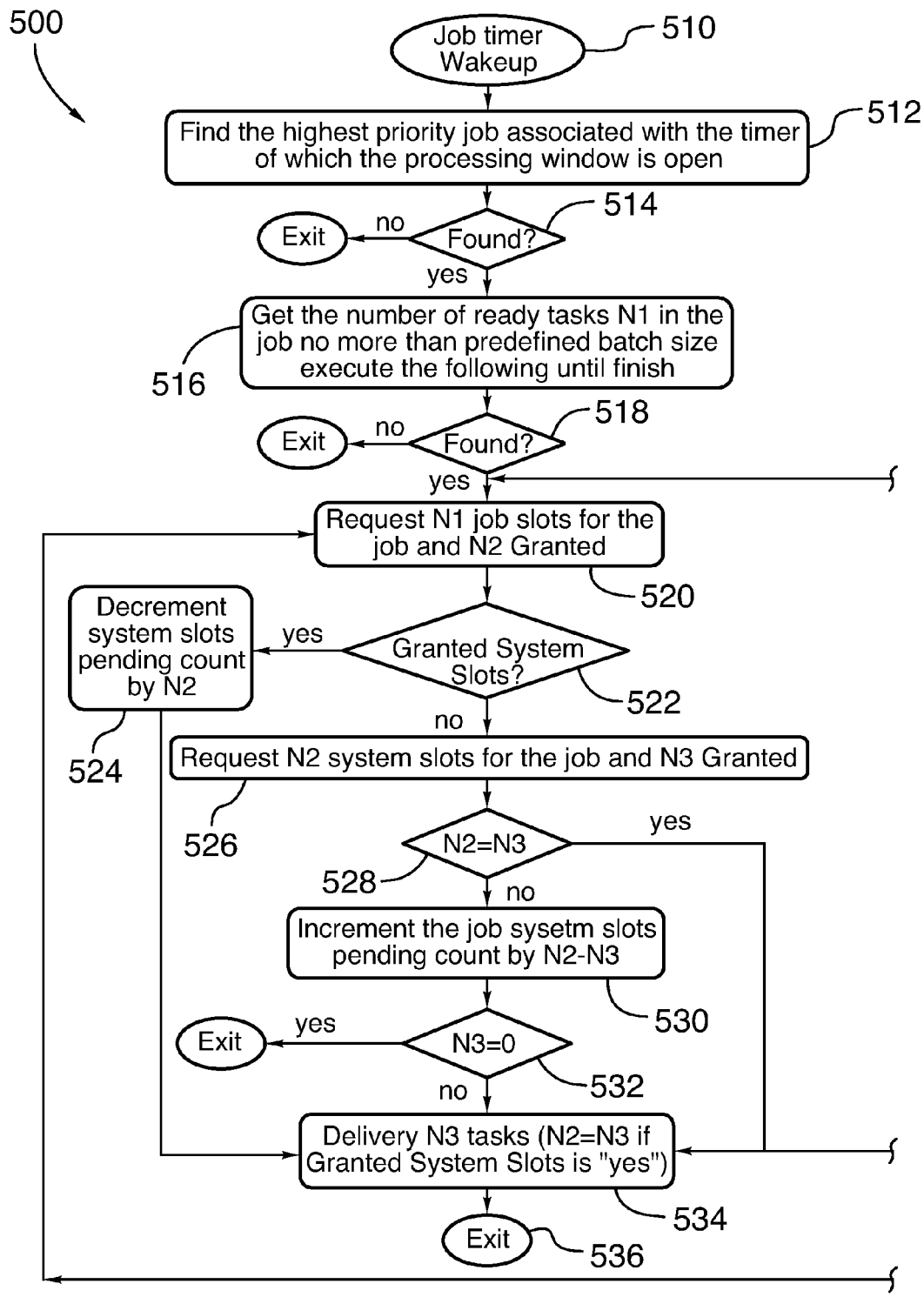
FIG. 5A and FIG. 5B are a flow diagram illustrating an example method for executing tasks and processing a finished task for use with the system of FIG. 1.
Figure 5B:
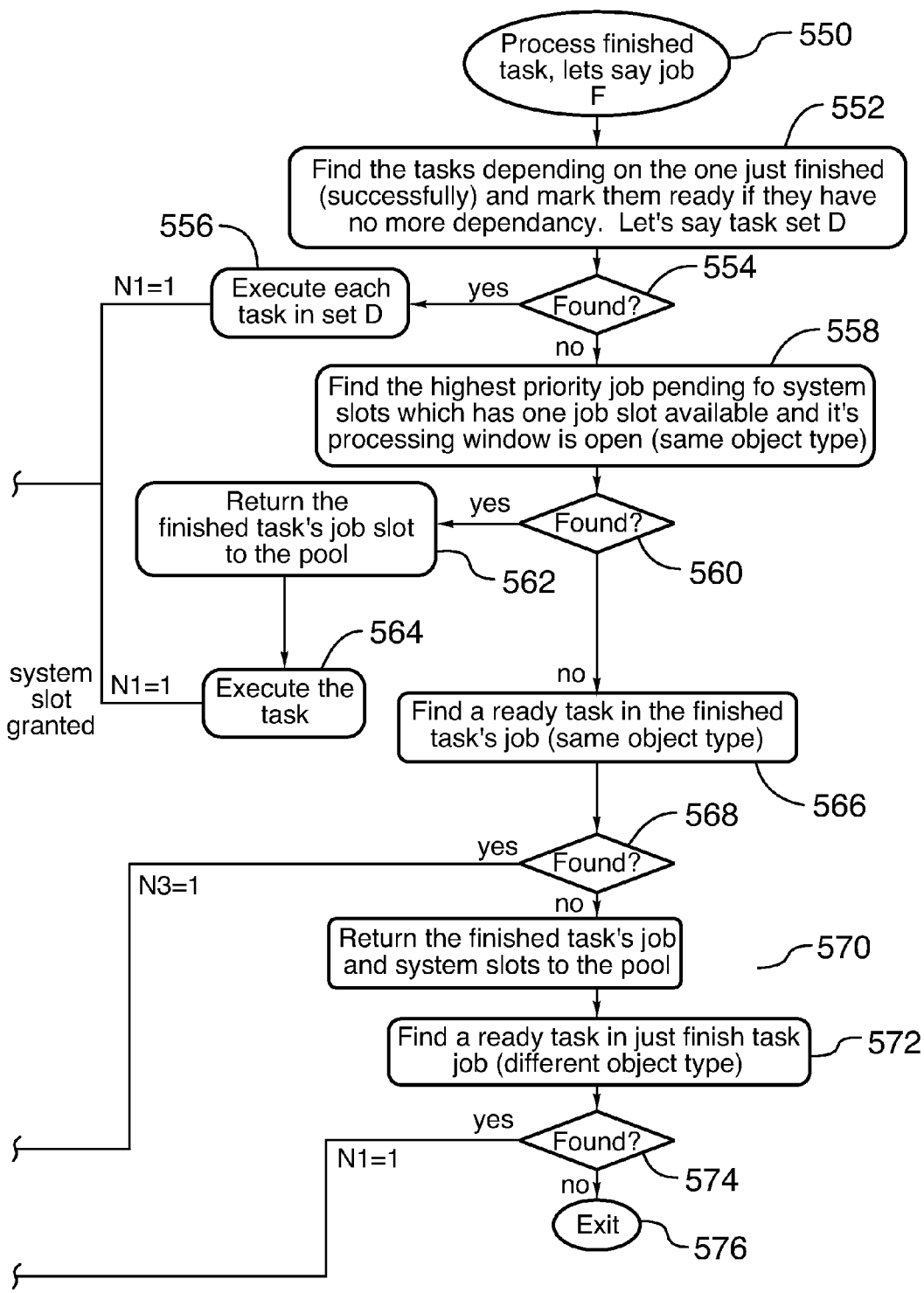

FIG. 5A and FIG. 5B are a flow diagram illustrating an example method 500 for executing tasks and processing a finished task. The steps or operations described herein are examples. There may be many variations to these steps or operations without departing from the scope of this disclosure. For instance, where appropriate, the steps may be performed in a differing order, or steps may be added, deleted, or modified.

When a job timer wakes up, the system will execute ready tasks from jobs based on their priority of execution. System throttling and job throttling parameters determine how many tasks can be executed at the same time. A task can only be executed if it has been granted a job slot (for job throttling) and a system slot (for system throttling). If a system slot is not available to execute a task, then information is recorded regarding what kind of task is waiting for a system slot in order to be executed. Once both a job slot and a system slot become available, the job manager will pick a task to execute based on its priority among the pending tasks.

The execution of a task can involve delivering an object to the UE 150. The details of how to do the delivery can be known by the plug-in that supports the delivery functionality set for that particular reconciliation object type. Hence delivery is initiated by the job manager of the administration service 100, even though it is carried out via a plug-in that is registered the implements the delivery functionality set for the object type.

When a task is completed successfully, then tasks that depend on the successfully completed task can be marked ready to deliver. If there are ready tasks due to the completed task, then the job manager will deliver these ready tasks subject to the system and job throttling parameters at that time. If there are no dependent tasks, the job manager will try to find another ready task in the job for next execution. When a task is not completed successfully, the job manager can mark the dependent tasks of the unsuccessfully completed task as failed and find a ready task in the job that can be executed next.

A particular UE 150 is serviced via a specific mobility server of mobility service 130. Tasks are executed such that the load of task execution is balanced across the various servers of mobility service 130.

Additionally, in the case of a job task that has not completed within a system allowed time threshold, the job manager will set the task to be timed out, so that the job and system slots can be used to execute another task.

In step 510, a portion of method 500 for executing tasks begins responsive to a "wake-up" expiration of a job timer. In step 512, the administration service 100 finds the highest priority job associated with the timer of which the processing window is open. In step 514, if no job is found, the method exits. In step 516, the administration service 100 obtains the number of ready tasks N1 in the job (or the predefined batch size, whichever is smaller). In step 518, if no ready tasks are found, the method exits.

In step 520, the administration service 100 requests a number N1 job slots for the job. The result of the request is a number N2 of job slots granted. In step 522, a check is made to determine if system slots were granted. If so execution continues in step 524, in which the system slots pending count is decremented by the number N2 of granted job slots, and execution continues in step 534. Otherwise, execution continues in step 526. In step 526 (no system slots granted), the administration service 100 requests a number of system slots equal to the number N2 of granted job slots. The result of the request is a number N3 of system slots granted.

In step 528, a check is made to determine if the number N2 of granted job slots is equal to the number N3 of granted system slots. If so, execution continues with step 534. Otherwise, execution continues with step 530, in which the job system slots pending count is incremented by the difference between the number N2 of granted job slots and the number N3 of granted system slots (i.e., N2-N3). In step 532, in which a check is made to determine if the number N3 of granted system slots is zero (meaning that no system slots were granted). If no system slots were granted, no task can be executed, and the method exits. However, in step 534, if system slots were granted earlier in one of steps 522 or 530, then a number of tasks equal to the number N3 of granted system slots are delivered. Generally, "delivery" means that an object or other content is delivered to the UE 150.

A portion of method 550 for processing a finished task (which is a member, for example, of a job F), begins in step 550, when the work of the task is complete. In step 552, the administration service 100 finds each task that depends on the successfully "finished" task and if such task has no other unmet dependencies, administration service 100 marks such task as ready for execution. Such tasks may be grouped as a task set D.

In step 554, a check is made to determine if any such tasks have been found. If so, execution continues in step 556, in which each of the tasks of task set D are selected for execution, and then in steps 520, etc. Otherwise, execution continues in step 558, in which the administration service 100 finds the highest priority job pending for system slots which has one job slot available and its processing window open (meaning that the job has the same object type as that of recently-finished task.

In step 560, a check is made to determine if an eligible job has been found. If so, execution continues in step 562 in which the job slot is returned to the pool of job slots, in step 564 in which the task is prepared for execution, and then in steps 520, etc. If no eligible job was found in step 560, then execution continues in step 566, to find a ready task of job F of the same object type as that of the recently-finished task.

In step 568, a check is made to determine if a ready task was found. If so, the task, which reuses recently-finished task job and system slots, is executed in step 534, etc. Otherwise, execution continues in step 570, in which the job and system slots reserved for the tasks of this job are returned to their respective pools. In step 572, the administration service 100 finds a ready task, which may be from a different job. If a ready task is found, then the number N1 of requested job slots is set to 1, and execution continues at steps 520, etc. If no ready task is found, the method exits at step 576.

Embodiments described herein may be realized as a computer program product, comprising a computer readable medium, computer instructions stored on the computer readable medium, the computer instructions being executable by one or more processors in a mobile communications device for implementing any of the methods described in this application.

Although example embodiments of this disclosure have been depicted and described in detail herein, it will be apparent to those skilled in the relevant art that various modifications, additions, substitutions, and the like can be made without departing from the concepts and embodiments disclosed herein, and these are therefore considered to be within the scope of the present subject matter as defined in the following claims.

What is claimed is:

1. A method of an administration server comprising:
   assigning a first attribute to one or more objects by a plug-in of an administration service of the administration server;
   adding one or more tasks by one or more plug-ins to a job created by one of the one or more plug-ins, wherein a plurality of system throttling parameters and job throttling parameters of the job and the one or more tasks determine a number of tasks that can be executed at a same time, and wherein each task can only be executed when it has been granted a system slot and a job slot; and
   wherein the plug-in implements a method of a functionality set to extend the one or more objects with the first attribute transparently to the administration server, the method being callable by the administration service to perform the assigning.

2. The method of claim 1 wherein the assigning is in response to the first attribute being assigned to one of a group, a server, a service, and a domain, and wherein the plurality of system throttling parameters quantify a number of system slots to limit a total number of tasks executing simultaneously all jobs of the administration service, and the job throttling parameters quantify a number of job slots to limit the execution of a task of a job.

3. The method of claim 2, further comprising:
   displaying the first attribute on a graphical user interface (GUI) of the administration service at an integration point defined by the administration service and identified by the plug-in, and wherein the job and the one or more tasks each comprise a scheduling parameter and a throttling parameter, the scheduling parameter schedules an execution date, and the throttling parameter quantifies a number of job slots used to limit the execution of a task of a job.

4. The method of claim 1, wherein the first attribute is one of a policy, a software configuration, a required application, an optional application, a disallowed application, a device software configuration, a device software bundle, a native application setting, or an application setting.

5. The method of claim 2, wherein the one or more objects inherit a second attribute from the one of the group, the server, the service, and the domain.

6. The method of claim 5, further comprising reconciling the assignment of the first attribute with the assignment of the second attribute when the first attribute conflicts with the second attribute.

7. The method of claim 5, further comprising reducing a number of duplicate tasks that assign the first attribute and the second attribute to the one or more objects when the first attribute is similar to the second attribute and is assigned to a same one of the one or more objects.

8. A method of an administration server comprising:
triggering a reconciliation event by changing an assignment of an attribute of one or more users that each comprise one or more objects of one or more plug-ins by the one or more plug-ins to extend the one or more objects with the changed assignment of an attribute transparently to the administration server;
determining a scope of the one or more users affected by changing the assignment;
determining one or more objects of the one or more plug-ins that are affected by changing the assignment;
reconciling the assignment with any conflicting assignments via one or more reconciliation objects, the conflicting assignments determined from one of the scope and the one or more objects that are affected; and
adding one or more tasks by one or more plug-ins to a job created by one of the one or more plug-ins, wherein a plurality of system throttling parameters and job throttling parameters of the job and the one or more tasks determine a number of tasks that can be executed at a same time, and wherein each task can only be executed when it has been granted a system slot and a job slot.

9. The method of claim 8, wherein changing the assignment of the attribute is via changing the association of a user to at least one of a group, a service, a server, or a domain, and wherein the plurality of system throttling parameters quantify a number of system slots to limit a total number of tasks executing simultaneously all jobs of the administration server and the job throttling parameters quantify a number of job slots to limit the execution of a task of a job.

10. The method of claim 9, wherein the changing the assignment of the attribute is via directly changing the attribute of at least one of a user, a group, a service, a server, and a domain, and wherein the job and the one or more tasks each comprise a scheduling parameter and a throttling parameter, the scheduling parameter schedules an execution date, and the throttling parameter quantifies a number of job slots used to limit the execution of a task of a job.

11. The method of claim 8, wherein the attribute is one of a policy, a software configuration, a required application, an optional application, a disallowed application, a device software configuration, a device software bundle, a native application setting, or an application setting.

12. The method of claim 8, wherein the triggering a reconciliation event is caused by changing a ranking of the one or more reconciliation objects.

13. The method of claim 8, wherein one of the one or more reconciliation objects is one of deleted and modified.

14. The method of claim 8, wherein the triggering a reconciliation event is caused by one of activating a first wireless mobile device, changing from the first wireless mobile device to a second wireless mobile device, setting a personal identification number (PIN) for the wireless mobile device, moving to a different server of a mobility service, and changing an operating system (OS) bundle of the first wireless mobile device.

15. A method of an administration server comprising:
assigning an attribute to an object of one or more users via an administration service; adding one or more tasks by one or more plug-ins to a job created by one of the one or more plug-ins, the one or more tasks performing the assigning;
removing one or more of the one or more tasks from the job to optimize the job based on a set of rules;
performing the assigning by the one or more plug-ins to extend the one or more objects with the attribute transparently to the administration server; and
adding one or more tasks by one or more plug-ins to a job created by one of the one or more plug-ins, wherein a plurality of system throttling parameters and job throttling parameters of the job and the one or more tasks determine a number of tasks that can be executed at a same time, and wherein each task can only be executed when it has been granted a system slot and a job slot.

16. The method of claim 15, further comprising:
closing the job before the removing;
reopening the job after the removing;
adding at least one additional task to the job; and
closing the job after the adding.

17. The method of claim 15, wherein the attribute is one of a policy, a software configuration, a required application, an optional application, a disallowed application, a device software configuration, a device software bundle, a native application setting, or an application setting, and wherein the plurality of system throttling parameters quantify a number of system slots to limit a total number of tasks executing simultaneously all jobs of the administration service, and the job throttling parameters quantify a number of job slots to limit the execution of a task of a job.

18. The method of claim 17, wherein the job and the one or more tasks each comprise scheduling parameter and a throttling parameter, the scheduling parameter schedules an execution date, and the throttling parameter quantifies a number of job slots used to limit the execution of a task of a job.

19. The method of claim 18, wherein a plurality of system throttling parameters and the job throttling parameters of the job and the one or more tasks determine a number of tasks that can be executed at a same time.

20. The method of claim 19, wherein each task can only be executed when it has been granted a system slot and a job slot, the plurality of system throttling parameters quantify a number of system slots to limit a total number of tasks executing simultaneously all jobs of the administration service, and the job throttling parameters quantify a number of job slots to limit the execution of a task of a job.

21. The method as claimed in claim 1, further comprising:
triggering a reconciliation event by changing an assignment of the first attribute of one or more users comprising the one or more objects of one or more plug-ins;

determining a scope of the one or more users affected by changing the assignment; determining one or more objects of the one or more plug-ins that are affected by changing the assignment;

reconciling the assignment with any conflicting assignments via one or more reconciliation objects, the conflicting assignments determined from one of the scope and the one or more objects determined to be affected; and adding one or more tasks by one or more plug-ins to a job created by one of the one or more plug-ins, wherein a plurality of system throttling parameters and job throttling parameters of the job and the one or more tasks determine a number of tasks that can be executed at a same time, and wherein each task can only be executed when it has been granted a system slot and a job slot.

22. The method as claimed in claim 21, wherein the changing an assignment of the first attribute is via changing the association of a user to at least one of a group, a service, a server, or a domain.

23. The method as claimed in claim 21, wherein the changing an assignment of the first attribute is via directly changing the first of at least one of a user, a group, a service, a server, and a domain.

24. The method as claimed in claim 21, wherein the triggering a reconciliation event is caused by changing a ranking of the one or more reconciliation objects.

25. The method as claimed claim 21, wherein one of the one or more reconciliation objects is one of deleted and modified.

26. The method as claimed in claim 21, wherein the triggering a reconciliation event is caused by one of activating a first wireless mobile device, changing from the first wireless mobile device to a second wireless mobile device, setting a personal identification number (PIN) for the wireless mobile device, moving to a different server of a mobility service, and changing an operating system (OS) bundle of the first wireless mobile device.

27. The method as claimed in claim 1, further comprising:
adding one or more tasks by one or more plug-ins to a job created by one of the one or more plug-ins, the one or more tasks performing the assigning;
removing one or more of the one or more tasks from the job to optimize the job based on a set of rules; and
performing the assigning by the plug-in.

28. The method as claimed in claim 27, further comprising:
closing the job before the removing;
reopening the job after the removing;
adding at least one additional task to the job; and
closing the job after the adding.

29. The method as claimed in claim 27, wherein the job and the one or more tasks each comprise a scheduling parameter and a throttling parameter, the scheduling parameter schedules an execution date, and the throttling parameter quantifies a number of job slots used to limit the execution of a task of a job.

30. The method as claimed in claim 29, wherein a plurality of system throttling parameters and the job throttling parameters of the job and the one or more tasks determine a number of tasks that can be executed at a same time.

31. The method as claimed in claim 30, wherein each task can only be executed when it has been granted a system slot and a job slot, the plurality of system throttling parameters quantify a number of system slots to limit a total number of tasks executing simultaneously all jobs of the administration service, and the job throttling parameters quantify a number of job slots to limit the execution of a task of a job.

32. A server configured to perform the method of claim 1.

33. A non-transitory computer readable medium storing a set of instructions configured to perform the steps of claim 1.

* * * * *